UNITED STATES PATENT OFFICE.

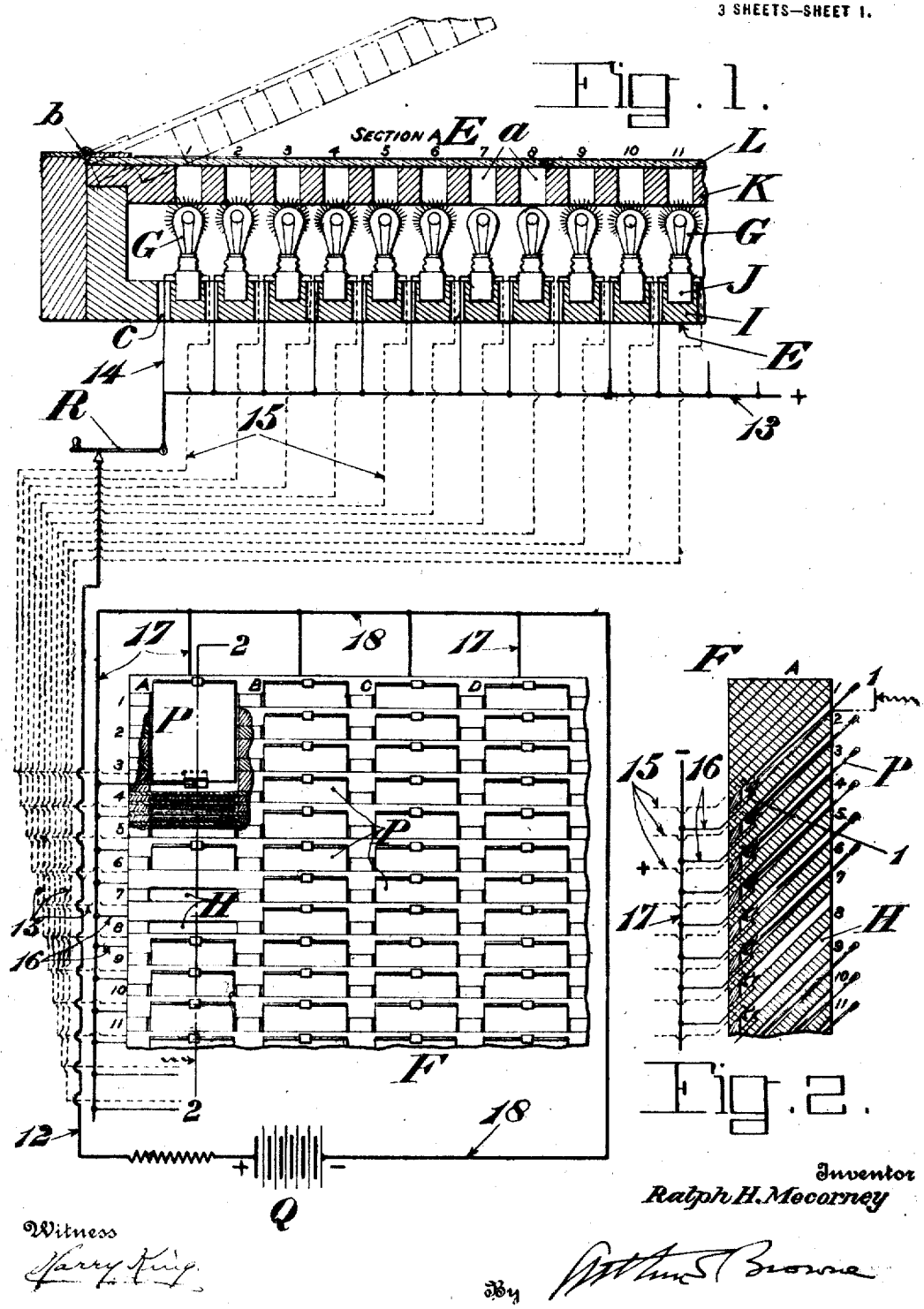

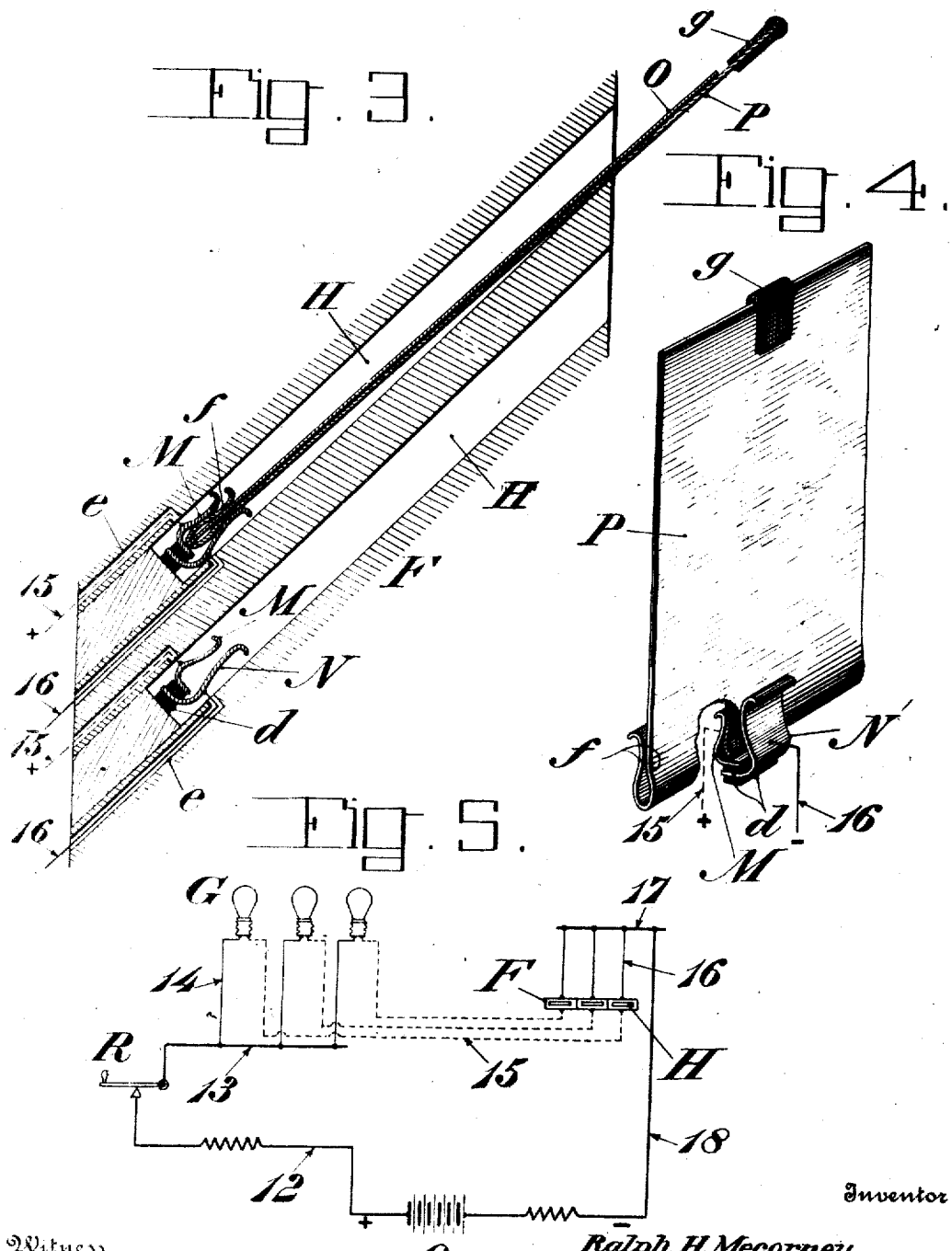

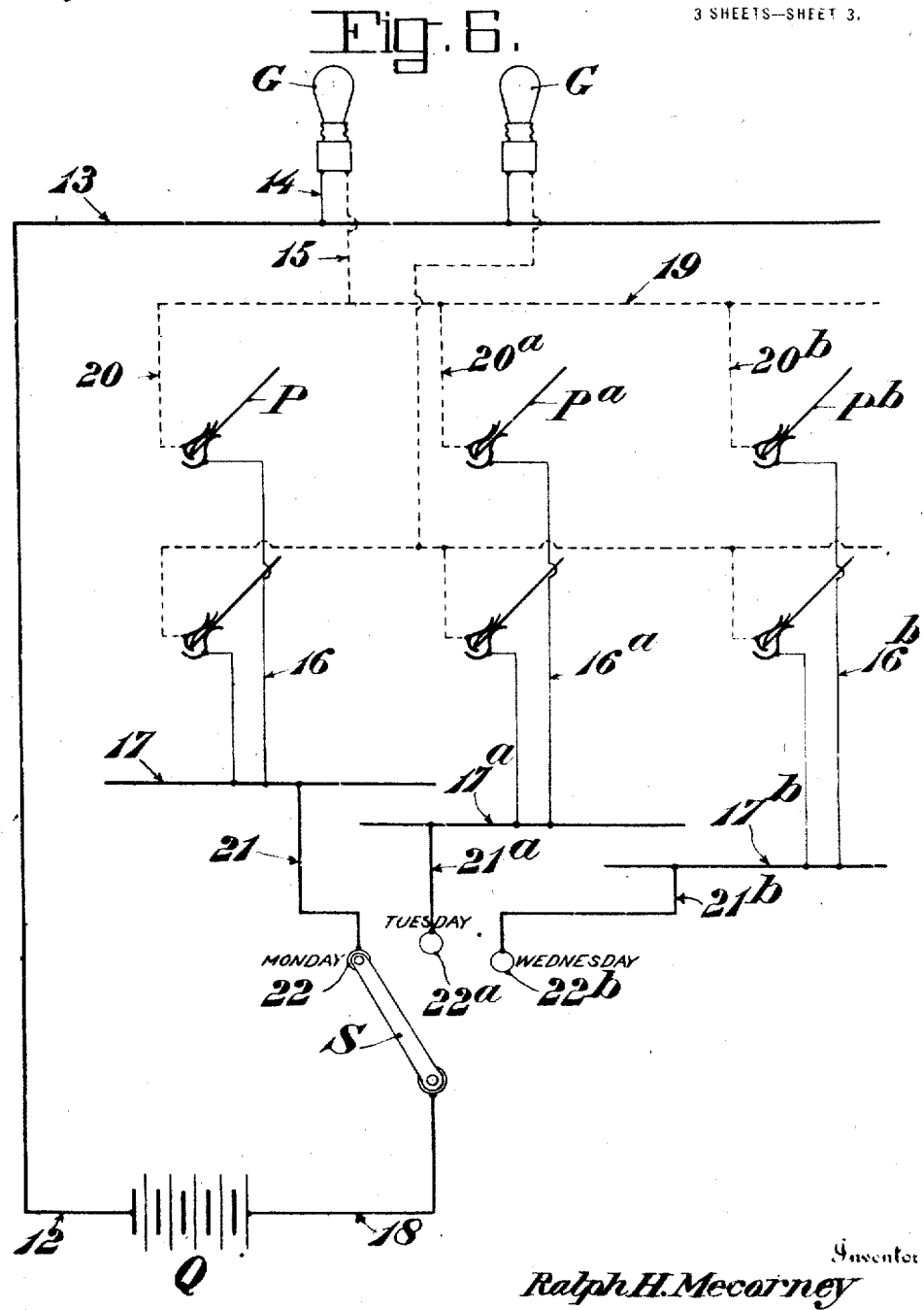

RALPH H. MECORNEY, OF ST. ALBANS, VERMONT.

THEATER-SEAT-INDICATING APPARATUS.

1,403,048.

Specification of Letters Patent. Patented Jan. 10, 1922.

Application filed October 1, 1919. Serial No. 327,730.

*To all whom it may concern:*

Be it known that I, RALPH H. MECORNEY, of St. Albans, in the county of Franklin and State of Vermont, have invented a new Theater-Seat-Indicating Apparatus, of which the following is a specification.

This invention is particularly designed for use in theater box offices and relates to the automatic indication upon a representation of the seating plan of the theater all unsold seats in the theater for any performance for which reserved seat tickets are being sold, in order that a patron may select any individual seat or group of seats which the indicator shows to be still available.

The apparatus for accomplishing this object is shown in the accompanying drawings, in which—

Figure 1, is a schematic illustration of the indicator, ticket rack, and electrical circuits. Fig. 2, is a sectional view on the line 2—2 in Fig. 1 of the ticket rack. Fig. 3, is an enlarged detail view illustrating the ticket compartments. Fig. 4, is an enlarged perspective, with parts broken away, of a ticket holder and its contacts. Fig. 5, is a diagram illustrating the electric circuits. Fig. 6, is a diagram showing the system for use in box offices where tickets for more than one performance are on sale.

The apparatus comprises an indicator E, ticket rack F, and electrical connections therebetween. The indicator E, has a visual electrically controlled signal, such as an electric light G, for each reserved seat. These signals are arranged in a plurality of rows corresponding with the sections of seats in the theater. Fig. 1, illustrates a numbered row of eleven signal lights representing eleven seats of section A, of the theater. One side of the indicator is extended sufficiently to provide signal lights for all the seats in a section. There are in practice as many of these rows of signal lights as there are sections of reserved seats in the theater, and as many lights in each row as there are seats in each section. The indicator thus constitutes a representation of the theater.

The cooperating ticket rack F, has a plurality of rows of pockets or compartments H containing the reserved tickets, there being a separate pocket for each ticket. Fig. 1, shows four rows of compartments corresponding with sections A, B, C, and D, of the theater seats with eleven numbered compartments in each row. One side and the bottom are broken away to indicate that the rack is extended to provide for all reserved seat tickets. Each signal light is electrically connected with one of the ticket compartments and the organization is such that the signal is displayed depending upon whether or not the corresponding ticket has been sold. With the specific organization shown the signal lights show for all unsold tickets, and on the sale of a ticket its signal light is extinguished and put out of commission. The indicator is located in the shelf of the window through which the ticket seller transacts business with the patrons of the theater or other hall, and in view of the patrons. The indicator is a box having a bottom I, carrying sockets J, for the signal lights. The cover K, of the box has rows of apertures *a*, one for each signal, each aperture being in register with the corresponding signal. Above these apertures is a sheet L, of transparent or translucent material through which the signals show. This transparent sheet bears the number of the seats and letters of the sections and constitutes a plan or diagram of the reserved seats of the theater. The cover K, is hinged at *b*, so that it may be opened to get access to the signal lights. The bottom of the indicator has holes *c*, for the passage of the wires leading to and from the signal lights.

Each pocket or compartment H, of the ticket rack has at its base a two-part spring clip consisting of two fingers M and N insulated from each other by a support *d*, of insulating material. An electric wire extends from each finger of each clip through a channel *e*, in the base of the rack. Each ticket compartment is in circuit by means of the two wires extending therefrom to the signal light corresponding to the seat for which it is numbered. Each ticket O, is supported by a metallic holder P, the lower end of which is bent to form a clasp *f*, to retain the ticket. When a holder with its ticket is placed in a compartment, its clasp is forced between the two spring fingers M and N, thereby completing a circuit through the clip constituted by said fingers; and since the clip is in a circuit with its corresponding signal of the indicator, the ticket holder P constitutes a switch controlling the individual circuit to such light. Each holder P has a knob $g$, of insulating material to facilitate withdrawing it from its compartment.

Referring to Fig. 5, the circuits will be described in connection with a single signal and ticket holder. From an electric generator Q, a conductor 12, leads through a control switch R, to a bus-bar 13. Branch wire 14, extends from the bus-bar, to each signal. One such wire 14 is numbered in Fig. 5, leading to the right hand light G. From this light leads a wire 15, to the finger M, of the clip in the corresponding compartment. A wire 16, extends from the second finger N of this clip to a bus-bar 17, from which a conductor 18 leads to the opposite pole of the generator Q. A similar circuit connects each signal to its ticket compartment. Fig. 1, shows wires 15, running from the row of signals in the indicator to the corresponding pockets or compartments in the first section A, of the ticket rack. Also this figure and Fig. 2, show the wires 16, leading from all the compartments of this rack section to the bus-bar 17. Each additional row of signal lights in the indicator is similarly connected to a bus-bar corresponding to bus-bar 13 to which the conductor 12, is also connected, and also to the compartments of a corresponding section of the ticket-rack; and the outgoing wires from the compartments of each additional section are connected through a bus-bar 17, to the return conductor 18. The wires extending from the indicator to the ticket rack are in practice inserted into a cable. The control switch simultaneously opens and closes all of the circuits.

At all times where there are no patrons at the box office window and after each sale the control switch R, is opened and all signal lights are extinguished. When a patron desires to know the unsold seats the ticket seller closes the switch R, and at once all signal lights under seat marks on the diagram for which tickets are still in the rack will be lighted. Hence the patron can tell at a glance what seats are available for his purchase and he is also enabled to know exactly the location of his seats in the house at the time of purchase. When the patron states the seats he desires the ticket seller extracts the corresponding tickets and holders from the rack, thereby breaking the circuit to the signal lights beneath the designated seats. Thus through the extinguishment of the corresponding lights the patron is certain that he has obtained the desired seats. For example, referring to Figs. 1 and 2, it will be noted that seats 7 and 8 of section A have been sold. Accordingly, the circuit is not completed in the compartments 7 and 8 and therefore signal lights 7 and 8 are extinguished showing unmistakably that these seats have been sold. At all times on closing the control switch the signal lights which shine indicate unsold seats.

In order that the apparatus may be used for each day in the week and indicate the unsold seats for each day, or each performance, the organization indicated in Fig. 6 may be used. Fig. 6, illustrates apparatus for only three days, but this is sufficient to illustrate the principle. As shown there is but a single indicator, but there is a separate ticket rack for each performance. Two signal lights G, only are shown and two ticket holders P, in each rack, which is sufficient to explain the circuits. The conductor 12, leads from the generator Q, to the bus-bar 13, of each row of signals G of the indicator, a branch wire 14, leading to each signal. A switch may be interposed in the conductor 12 (as in Figs. 1 and 5) but is not essential, and is omitted in Fig. 6. The return wire 15, from each signal leads to a bus-wire 19 common to all of the racks. From this bus-wire conductors 20, 20$^a$ and 20$^b$ lead to the initial ticket holders P, P$^a$ and P$^b$, respectively, of the second racks. From these ticket holders the return wires 16, 16$^a$ and 16$^b$, connect respectively with bus-bars 17, 17$^a$ and 17$^b$. When the switch connects with contact 22, the "Monday" rack is in communication with the indicator; when in connection with the contact 22$^a$, the "Tuesday" rack is in communication with the indicator; and when in connection with the contact 22$^b$, the "Wednesday" rack is in communication with the indicator. When the patron desires to know the unsold seats is "Monday, the ticket seller places the control switch S as shown in Fig. 6, whereupon an holders having unsold tickets in the rack containing Monday's tickets will cause their corresponding signal lights to glow in the indicator. If the patron had inquired for seats for Tuesday or Wednesday, the ticket seller would have turned the switch to engage the proper contact, and only the signal lights for the unsold seats for that performance would shine.

The switch S, can be used to select the racks for the several performances, and also to turn on the lights. Or it can be used solely as a rack selector, and a switch like that of Figs 1 and 5, can be introduced in the supply conductor 12, to control the signal lights. Instead of the single multiple switch S, a separate switch can be employed for each rack. It suffices that there should be a selective switch mechanism by which any one of the racks can be put into operative connection with the indicator.

I claim—

A ticket indicating apparatus having, in combination, a ticket rack comprising a plurality of compartments for removable circuit closing ticket holders, a plurality of electrically controlled signals each corresponding to a compartment and means whereby the removal from the said rack of a ticket holder opens the electrical supply circuit of a corresponding signal.

In witness whereof, I have hereunto signed my name.

RALPH H. MECORNEY.